United States Patent
Sugaya

(10) Patent No.: US 10,165,129 B2
(45) Date of Patent: Dec. 25, 2018

(54) DATA COMMUNICATION TERMINAL, FEE MANAGEMENT SYSTEM AND FEE MANAGEMENT METHOD AND PROGRAM

(71) Applicant: OPTiM CORPORATION, Takagise-cho, Saga-shi, Saga (JP)

(72) Inventor: Shunji Sugaya, Tokyo (JP)

(73) Assignee: OPTiM CORPORATION, Saga (JP)

( * ) Notice: Subject to any disclaimer, the term of this patent is extended or adjusted under 35 U.S.C. 154(b) by 168 days.

(21) Appl. No.: 14/816,973

(22) Filed: Aug. 3, 2015

(65) Prior Publication Data

US 2016/0277592 A1    Sep. 22, 2016

Related U.S. Application Data

(60) Provisional application No. 62/136,627, filed on Mar. 22, 2015.

(51) Int. Cl.
| | |
|---|---|
| H04M 11/00 | (2006.01) |
| H04M 15/00 | (2006.01) |
| H04L 12/14 | (2006.01) |

(52) U.S. Cl.
CPC .... *H04M 15/8214* (2013.01); *H04L 12/1428* (2013.01); *H04L 12/1435* (2013.01); *H04L 12/1457* (2013.01); *H04M 15/61* (2013.01); *H04M 15/8033* (2013.01)

(58) Field of Classification Search
CPC .............. H04M 15/8214; H04M 15/16; H04L 12/1435
USPC .................. 455/406, 407; 709/206
See application file for complete search history.

(56) References Cited

U.S. PATENT DOCUMENTS

| | | | | |
|---|---|---|---|---|
| 6,925,160 | B1* | 8/2005 | Stevens | G06Q 30/04 379/114.03 |
| 8,676,155 | B2* | 3/2014 | Fan | H04W 4/14 370/428 |
| 2002/0016823 | A1* | 2/2002 | Ueno | H04L 51/063 709/206 |
| 2002/0157028 | A1* | 10/2002 | Koue | H04L 9/32 726/3 |
| 2006/0084410 | A1* | 4/2006 | Sutaria | H04L 12/14 455/408 |
| 2014/0279454 | A1* | 9/2014 | Raman | H04L 63/08 705/40 |

* cited by examiner

*Primary Examiner* — Charles T Shedrick
(74) *Attorney, Agent, or Firm* — Potomac Law Group, PLLC; Kenneth M. Fagin

(57) ABSTRACT

The present invention determines whether the data traffic of the application is for private use or for business use and charges data communication charge to the appropriate user based on the traffic usage. The data communication terminal 100 runs an application, executes data communication to transmit tag information and the data traffic of the data communication to the charge management server 10 in response to the execution of the data communication. The charge management server 10 calculates the data communication charge corresponding to the data traffic received from the data communication terminal, and determines whether the data traffic is for private use or for business use based on the tag information received from the data communication terminal to calculate the data communication charge for each usage.

5 Claims, 7 Drawing Sheets

Fig. 4

SORTING TABLE

| CONTENT | USAGE |
|---|---|
| http://aaaaa.com | BUSINESS |
| IN-HOUSE GROUPWARE APPLICATION | BUSINESS |
| xxxxx@xxx.com | BUSINESS |
| ATTACHED FILE SIZE: 5 MB | BUSINESS |
| http://www.xxxx.com | PRIVATE |
| YYY APPLICATION | PRIVATE |
| yyyyy@yyyy.com | PRIVATE |
| ATTACHED FILE SIZE: 1 MB | PRIVATE |

Fig. 5

CHARGE AMOUNT TABLE

| USAGE | DATA TRAFFIC(GB) | AMOUNT OF CHARGE(JPY) |
|---|---|---|
| BUSINESS | 1 | 1066 |
| PRIVATE | 0.2 | 213 |

DATA COMMUNICATION TERMINAL, FEE MANAGEMENT SYSTEM AND FEE MANAGEMENT METHOD AND PROGRAM

CROSS-REFERENCE TO RELATED APPLICATION

This application is the non-provisional filing of U.S. provisional application 62/136,627 filed Mar. 22, 2015, the priority benefit of which is claimed and the contents of which are incorporated herein by reference

TECHNICAL FIELD

The present invention is related to a data communication terminal performing data communication, a charge management system, a charge management method, and a charge management program.

BACKGROUND ART

BYOD (Bring Your Own Device) in the company has become ubiquitous in recent years. BYOD means that an employee brings a privately owned portable device (for example, smartphone, PC, and tablet terminal) into the office and uses it for business. By introducing such BYOD, an employee can browse and edit necessary information outside the office or at home.

For example, an employee can send email and documents, etc. created at home, on business trip, etc. to the customer and print out the created documents etc. in the office. Moreover, Patent Document 1 discloses the system for printing out by using a printing device located in the offices, etc. from privately owned portable device.

CITATION LIST

Patent Literature

Patent Document 1: JP 2015-1842 A

SUMMARY OF INVENTION

However, when an employee uses the privately owned portable device to perform the data communication for using the application, the data communication charge according to the transmission of emails using the email application and the data communication charge according to the use of the in-house groupware application, etc., has to be beard by an employee who owns the portable device even though he/she uses it for business.

If the company bears the total data communication charge for the portable device that the employee brings in, the company must bear the data traffic of the application that the employee privately used. Therefore, it is difficult to calculate the appropriate data communication charge.

Even when the system described in Patent Document 1 is applied, the employee results in bearing the data communication charge necessary for printout. Therefore, an employee is forced to bear the data communication charge even though he/she uses it for business.

In this context, the objective of the present invention is to provide a data communication terminal, a charge management system, a charge management method, and a charge management program, through which determine whether the application data traffic is for private use or for business use and charges a user based on the traffic usage.

According to a first aspect of the present invention, a charge management system includes a data communication terminal and a charge management server managing a communication charge for the data communication terminal.

The data communication terminal includes:
a data communication unit running an application to execute data communication, and
a data communication information transmitter unit transmitting tag information and the data traffic of the data communication to the charge management server in response to the execution of the data communication.

The charge management server includes:
a data communication charge calculating unit calculating data communication charge corresponding to the data traffic received from the data communication terminal, and
a usage-based charge calculating unit determining whether the data traffic is for private use or for business use based on the tag information received from the data communication terminal to calculate data communication charge for each usage.

According to the first aspect of the present invention, the data communication terminal runs an application, executes data communication, and transmits tag information and the data traffic of the data communication to the charge management server in response to the execution of the data communication. Moreover, the charge management server calculates data communication charge corresponding to the data traffic received from the data communication terminal and determines whether the data traffic is for private use or for business use based on the tag information received from the data communication terminal to calculate data communication charge for each usage.

Although the first aspect of the present invention is related to the category of the charge management system, the same operation and the effect are demonstrated in the categories of the charge management method and the charge management program.

According to a second aspect of the present invention, in the charge management system according to the first aspect of the invention, the usage-based charge calculating unit determines the usage based on an email address included in the received tag information to calculate the data communication charge for each usage.

According to the second aspect of the present invention, the charge management system according to the first aspect of the invention determines the usage based on an email address included in the received tag information and calculates the data communication charge for each usage.

According to a third aspect of the present invention, in the charge management system according to the first or the second aspect of the present invention, the usage-based charge calculating unit determines the usage based on the size of an attached file included in the received tag information to calculate the data communication charge for each usage.

According to the third aspect of the present invention, the charge management system according to the first or the second aspect of the present invention determines the usage based on the size of an attached file included in the received tag information to calculate data communication charge for each usage.

According to a fourth aspect of the present invention, in the charge management system according to anyone of the first to the third aspects of the present invention, the usage-based charge calculating unit determines the usage based on the data traffic included in the received tag information to calculate data communication charge for each usage.

According to a fourth aspect of the present invention, the charge management system according to any one of the first to the third aspects of the present invention determines the usage based on the data traffic included in the received tag information to calculate data communication charge for each usage.

According to a fifth aspect of the present invention, in the charge management system according to any one of the first to the fourth aspects of the invention, the charge management server further includes a billing unit charging the data communication charge for each usage calculated by the usage-based charge calculating unit to billing address based on the usage.

According to the fifth aspect of the present invention, in the charge management system according to anyone of the first to the fourth aspects of the invention, the charge management server charges the data communication charge for each usage calculated by the usage-based charge calculating unit to billing address based on the usage.

According to a sixth aspect of the present invention, a data communication terminal managing its own data communication charge and includes:

a data communication unit running an application to execute the data communication;

a data communication information acquiring unit acquiring tag information and the data traffic of the data communication in response to the execution of the data communication;

a data communication charge calculating unit calculating data communication charge corresponding to the acquired data traffic;

a usage-based charge calculating unit determining whether the data traffic is for private use or for business use based on the acquired tag information to calculate data communication charge for each usage; and a data communication charge transmitter unit transmitting the calculated data charge for usage.

According to the sixth aspect of the invention, the data communication terminal managing its own data communication charge runs an application to execute the data communication, acquires tag information and the data traffic of the data communication in response to the execution of the data communication, calculates data communication charge corresponding to the acquired data traffic, determines whether the data traffic is for private use or for business use based on the acquired tag information, calculates data communication charge for each usage, and transmits the calculated data charge for each usage.

According to a seventh aspect of the present invention, the data communication terminal according to the sixth aspect of the invention further includes a billing unit charging the data communication charge for each usage calculated by the usage-based charge calculating unit to a billing address based on the usage.

According to the seventh aspect of the present invention, the data communication terminal according to the sixth aspect of the invention the data communication charge for each usage calculated by the usage-based charge calculating unit to a billing address based on the usage.

According to an eighth aspect of the present invention, a charge management method is executed by a data communication terminal and a charge management server managing a charge for the data communication terminal, includes the steps of:

running an application on the data communication terminal to execute data communication; and transmitting tag information and the data traffic of the data communication from the data communication terminal to the charge management server in response to the execution of the data communication;

calculating data communication charge on the charge management server, corresponding to the data traffic received from the data communication terminal; and determining whether the data traffic is for private use or for business use based on the tag information received from the data communication terminal on the charge management server to calculate data communication charge for each usage.

According to a ninth aspect of the present invention, a computer program product for use in a data communication terminal and a charge management server managing the charge for the data communication terminal, includes a non-transitory computer usable medium having a set of instructions physically embodied therein, the set of instructions including computer readable program code, which when executed by the data communication terminal causes the information processing unit to:

run an application to execute data communication, and transmit tag information and the data traffic of the data communication to the charge management server in response to the execution of data communication; and computer readable program code, which when executed by the charge management server causes the information processing unit to:

calculate the data communication charge corresponding to the data traffic received from the data communication terminal; and determine whether the data traffic is for private use or for business use based on the tag information received from the data communication terminal to calculate data communication charge for each usage.

The present invention can provide the data communication terminal, the charge management system, the charge management method and the charge management program determining whether the data traffic of the application is for private use or business use and charging the data communication charge to the appropriate user based on the traffic usage.

BRIEF DESCRIPTION OF DRAWINGS

FIG. 4 shows the sorting table stored by a charge management server 10.

FIG. 5 shows the charge amount table stored by a charge management server 10.

DESCRIPTION OF EMBODIMENTS

Hereinafter, a best mode of the present invention will be described with reference to the attached drawings. However, this is illustrative only, and the technological scope of the present invention is not limited thereto.

First Embodiment

Configuration of Charge Management System 1

Figure 1:
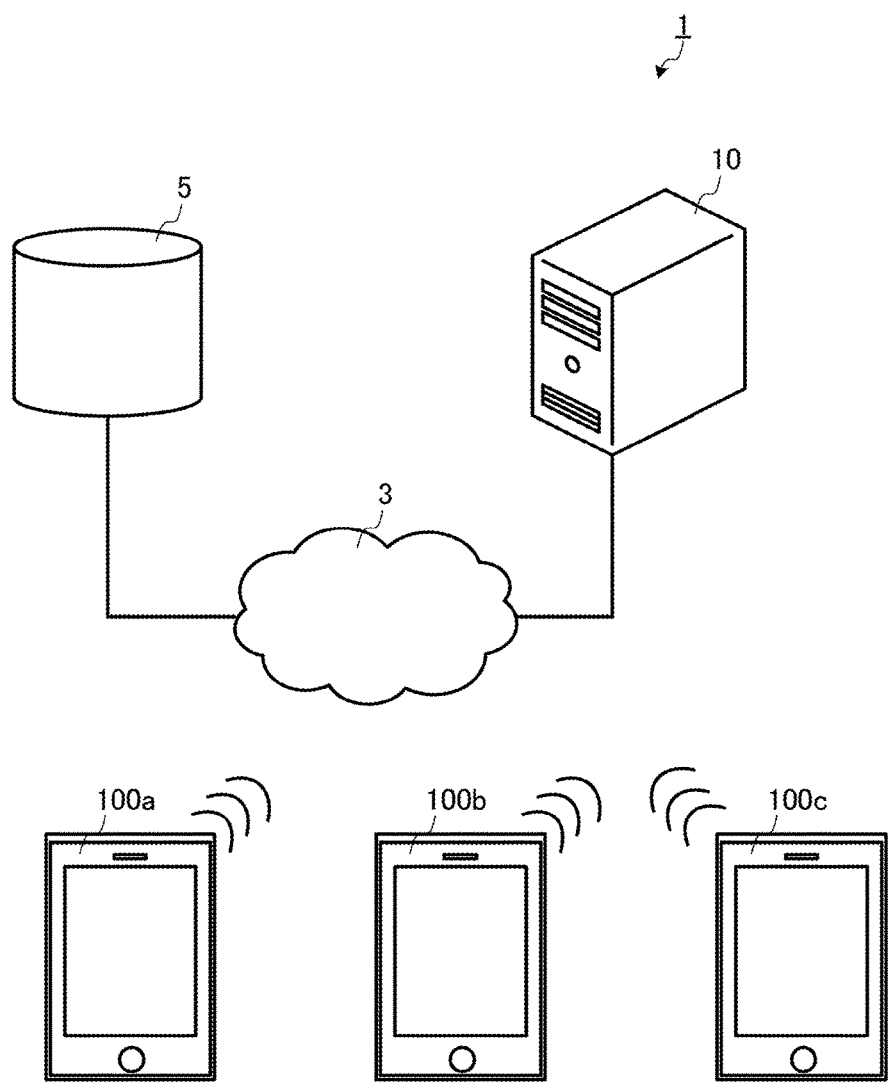
FIG. 1 shows the system configuration diagram of a charge management system 1.

FIG. 1 is the configuration diagram of the charge management system 1 as a preferred embodiment of the first aspect of the present invention. The charge management system includes a charge management server 10, data communication terminals 100a, b, c (hereinafter merely referred to as "data communication terminal 100" unless otherwise specified) and a common carrier DB 5. The charge management server 10 is communicatively connected with the data communication terminal 100 and the common carrier DB 5 through a public network 3 (the Internet network, third generation or fourth generation communication network, etc.)

The charge management server 10 is a server device provided with the functions described later. Moreover, the data communication terminal 100 is electrical appliances provided with the functions described later.

The data communication terminal 100 may be information appliances such as a smartphone, a tablet terminal, a net book terminal, a slate terminal, and an electronic book terminal in addition to a personal computer, a cellular phone, and a portable terminal.

The common carrier DB 5 stores the price plan created by each common carrier.

Functions

Figure 2:
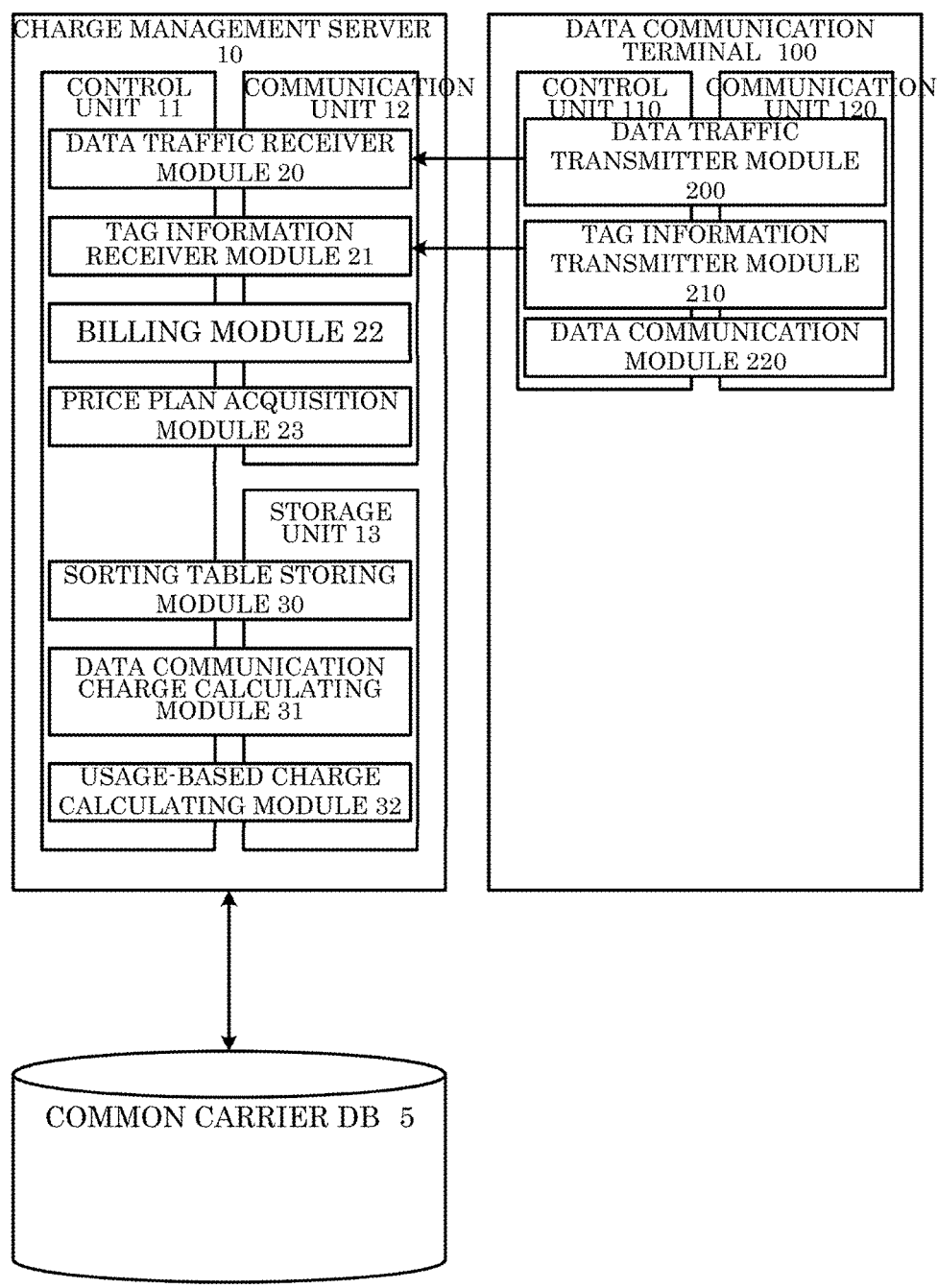
FIG. 2 shows the functional block diagram of a charge management server 10 and a data communication terminal 100 in the first embodiment.

The configuration of each device will be explained with reference to FIG. 2.

The charge management server 10 may include a control unit 11 such as a central processing unit (hereinafter referred to as "CPU"), random access memory (hereinafter referred to as "RAM"), and read only memory (hereinafter referred to as "ROM") and a communication unit 12 such as a device capable of communicating with other devices, for example a Wireless Fidelity or Wi-Fi® enabled device complying with IEEE 802.11.

The charge management server 10 also includes a data storage unit such as a hard disk, semiconductor memory, a recording medium, or a memory card as a storage unit 13 storing data and files. The charge management server 10 stores the sorting table and the charge amount table in the storage unit 13 described later.

In the charge management server 10, the control unit 11 reads a predetermined program and cooperates with the communication unit 12 to achieve a data traffic receiver module 20, a tag information receiver module 21, a billing module 22, and a price plan acquisition module 23. The control unit 11 also reads a predetermined program and cooperates with the storage unit 13 to achieve a sorting table storing module 30, a data communication charge calculating module 31, and a usage-based charge calculating module 32.

The data communication terminal 100 may include the control unit 110 such as a central processing unit (hereinafter referred to as "CPU"), random access memory (hereinafter referred to as "RAM"), and read only memory (hereinafter referred to as "ROM") and the communication unit 120 such as a device capable of communicating with other devices, for example a Wireless Fidelity or Wi-Fi® enabled device complying with IEEE 802.11, and LTE (Long Term Evolution) enabled device.

The data communication terminal 100 may also include a display unit outputting data and images that are controlled by the control unit as an output unit; and a touch panel, a keyboard, a mouse, and the like that receive input from a user as an input unit.

The control unit 110 also reads a predetermined program and cooperates with the communication unit 120 to achieve a data traffic transmitter module 200, a tag information transmitter module 210, and a data communication module 220.

Charge Management Process

Figure 3:
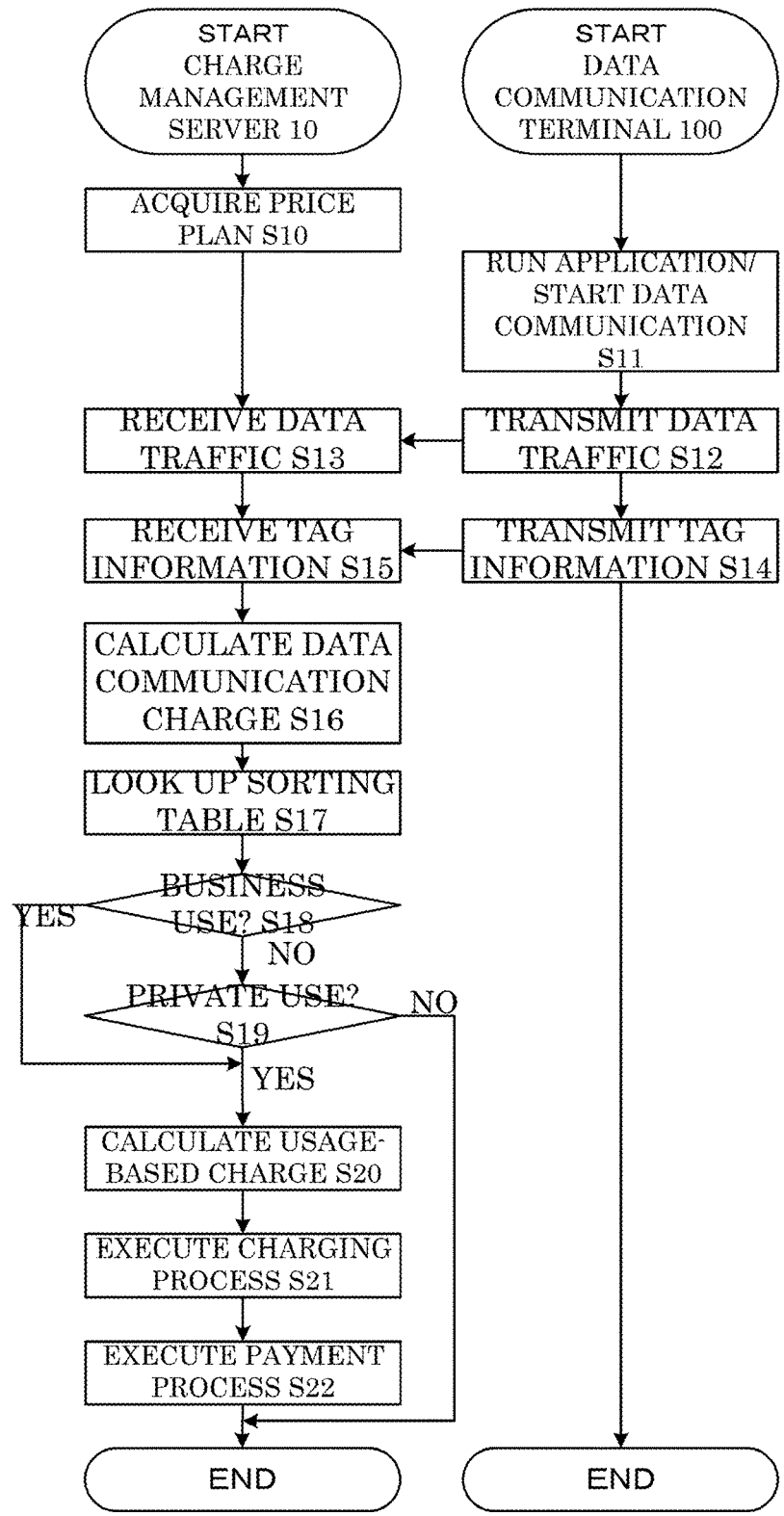
FIG. 3 shows the flow chart of the charge management process executed by a charge management server 10 and a data communication terminal 100 in the first embodiment.

FIG. 3 is the flow chart of the charge management process executed by the charge management server 10 and the data communication terminal 100. The process executed by the modules of each of the above-mentioned devices will be explained together with this process.

The price plan acquisition module 23 of the charge management server 10 acquires the price plan of the data communication terminal 100 from the common carrier DB 5 beforehand (Step S10). In the step S10, the price plan acquired by the price plan acquisition module 23 may be a price plan for which each user or the administrator of charge management server 10 has contracted with a common carrier beforehand. Moreover, the price plan may not be a price plan of each data communication terminal 100 but a price plan for which the charge management server 10 has contracted in bulk with a common carrier. Moreover, it may be another price plan. The price plan acquisition module 23 of the charge management server 10 may acquire the price plan from the data communication terminal 10.

The data communication module 220 of the data communication terminal 100 receives operation to the input-output unit of the data communication terminal 100 and the selection and the execution of an application. The data communication module 220 of the data communication terminal 100 starts the data communication of the executed application (Step S11). In the step S11, the application executed by the data communication module 220 includes various applications such as an email application, a web browser application, a groupware application, and a business oriented application.

The data traffic transmitter module 200 of the data communication terminal 100 transmits the data traffic of the data communication by the application executed by the data communication module 220 to the charge management server 10 (Step S12). In the step S12, the data traffic transmitted from the data traffic transmitter module 200 is generated by each application. In the step S12, the data communication terminal 100 determines whether the on-going data communication is LTE or Wi-Fi®. If the data communication terminal 100 determines that it is LTE, the data traffic transmitter module 200 transmits the data traffic. If the data communication terminal 100 determines that the on-going data communication is Wi-Fi®, the data traffic transmitter module 200 terminates the current process without transmitting the data traffic.

The data traffic receiver module 20 of the charge management server 10 receives the data traffic from the data traffic transmitter module 200 of the data communication terminal 100 (Step S13).

The tag information transmitter module 210 of the data communication terminal 100 transmits the tag information of the data communication executed by the data communication module 220 to the charge management server 10 (Step S14). In the step S14, the tag information transmitted by the tag information transmitter module 210 includes the type of the used application and the data used by the application. The information on the data includes for example, the URL browsed through a web browser application, and the destination email address, the originating email address, the presence or absence of the attached file, and size of attached file that have sent through an email application.

The tag information receiver module 21 of the charge management server 10 receives the tag information transmitted from the tag information transmitter module 210 of the data communication terminal 100 (Step S15).

The data communication charge calculating module 31 of the charge management server 10 calculates data communication charge for the data traffic based on the received data traffic (Step S16).

The sorting table storing module 30 of the charge management server 10 looks up the sorting table (Step 17) shown in FIG. 4 and determines whether the data communication is private use or business use based on the received tag information (Step S18 and Step S19).

Sorting Table

The sorting table referred by sorting table storing module 30 is described below with reference to FIG. 4.

The sorting table is stored in the storage unit 13 of the charge management server 10. The sorting table associates the content of communication with the usage. Specifically, URL, the type of application, and email addresses are included in the content of the communication. The character string "business" or "private" is stored as the usage. In the sorting table, the content of the communication are associated with each usage.

For example, the content of the communication associated with business use includes "http://aaaaa.com" for URL, "In-house groupware application" for the type of application, "xxxxx@xxx.com" for the email address and "attached file size: 5 MB" for the size of attached file. On the other hand, the content of the communication associated with private use includes "http://www.xxxx.com" for URL, "YYYY application" for the type of application, "yyyyy@yyyy.com" for the email address, and "attached file size: 1 MB" for the size of attached file. The item data of the sorting table may be entered by the user or the administrator of the charge management server 10. The item data other than those described in this embodiment may be registered beforehand.

The usage-based charge calculating module 32 of the charge management server 10 determines whether the usage of the data communication received is for business or not based on the received tag information and the sorting table (Step S18).

In the step S18, the usage-based charge calculating module 32 determines whether the usage is for business or not based on the usage associated with tag information received by the tag information receiver module 21. If determining that the usage is for business (Step S18: "YES"), the usage-based charge calculating module 32 calculates the usage-based charge and stores the amount of charge and the data amount in the charge amount table shown in FIG. 5 described later (Step S20).

In the step S18, the process executed by the usage-based charge calculating module 32 is described specifically below.

When the tag information received is "http://aaaaa.com" as URL, the usage-based charge calculating module 32 looks up the sorting table to acquire the usage associated with the URL. The usage-based charge calculating module 32 determines that the usage is for business because the usage associated with the URL is for business. When the tag information received is "In-house groupware application" as the type of application, the usage-based charge calculating module 32 looks up the sorting table to acquire the usage associated with the type of application. The usage-based charge calculating module 32 determines that the usage is for business because the usage associated with the type of application is for business. When the tag information received is "xxxxx@xxx.com" as email address, the usage-based charge calculating module 32 looks up the sorting table to acquire the usage associated with the email address. The usage-based charge calculating module 32 determines that the usage is for business because the usage associated with the email address is for business. When the tag information received is "attached file size: 5 MB" as size of attached file, the usage-based charge calculating module 32 looks up the sorting table to acquire the usage associated with the size of attached file. The usage-based charge calculating module 32 determines that the usage is for business because the usage associated with the size of the attached file is for business.

In the step S18, another method may be used to determine whether the usage is for business or not. For example, the information on whether the attached file is included in the transmitted email may be received as the tag information to determine whether the usage is for business or not based on the presence of the attached file. In this case, the usage is determined to be for business if the attached file is included.

Moreover, when the attached file is included in the transmitted email and the information on the size of attached file is received as the tag information to determine whether the usage is for business or not based on the size of attached file. In this case, the usage is determined to be for business if the size of attached file is equal to or larger than a predefined size.

Moreover, in the step S18, not the destination address but the originating address may be received as the tag information to determine whether the usage is for business or not based on the originating address. In this case, the usage is determined to be for business if the originating address is an email address provided in the office.

Moreover, in the step S18, the data traffic may be received as the tag information to determine whether the usage is for business or not based on the data traffic. In this case, the usage is determined to be for business if the data traffic is equal to or larger than a predefined value.

Moreover, the above-mentioned methods may be combined. For example, it may determine whether the usage is for business or not based on the data traffic and the size of attached file. In this case, the usage may be determined to be for business if the data traffic is equal to or larger than a predetermined value and the size of attached file is equal to or larger than a predetermined size. Moreover, another method may be used to determine whether the usage is for business or not.

In the step S18, if determining that the usage is not for business (Step S18: "NO"), the usage-based charge calculating module 32 determines whether the usage is for private or not (Step S19).

In the step S19, the usage-based charge calculating module 32 determines whether the usage is for private or not based on the usage associated with the tag information received by the tag information receiver module 21. If determining that the usage is for private (Step S19: "YES"), the usage-based charge calculating module 32 calculates the usage-based charge and stores the amount of charge and the data amount in the charge amount table shown in FIG. 5 described later (Step S20). Moreover, in the step S19, if determining that the usage is not for private (Step S19: "NO"), the usage-based charge calculating module 32 terminates the current process.

If determining that the usage is not for business in the above-mentioned step S18 and is not for private in the step S19, the usage may be considered to be for either business or private to calculate the data communication charge. Moreover, in this case, the notification may be sent to the administrator of the charge management server 10 to notify that the usage is unknown, and a process to add the tag information on whether the usage is for business or private for the data communication to the sorting table may be executed.

In the step S19, the process executed by the usage-based charge calculating module 32 is described specifically below.

When the tag information received is "http://www.xxxx.com" as URL, the usage-based charge calculating module 32 looks up the sorting table to acquire the usage associated with the URL. The usage-based charge calculating module 32 determines that the usage is for private because the usage associated with the URL is for private. When the tag information received is "YYYY application" as the type of application, the usage-based charge calculating module 32 looks up the sorting table to acquire the usage associated with the type of application. The usage-based charge calculating module 32 determines that the usage is for private because the usage associated with the type of application is for private. When the tag information received is "yyyyy@yyyy.com" as email address, the usage-based charge calculating module 32 looks up the sorting table to acquire the usage associated with the email address. The usage-based charge calculating module 32 determines that the usage is for private because the usage associated with the email address is for private. When the tag information received is "attached file size: 1 MB" as size of attached file, the usage-based charge calculating module 32 looks up the sorting table to acquire the usage associated with the size of attached file. The usage-based charge calculating module 32 determines that the usage is for private because the usage associated with the size of attached file is for private.

In the step S19, another method can be used to determine whether the usage is for private or not. For example, information on whether the attached file is included in the transmitted email may be received as the tag information to determine whether the usage is for private or not based on the presence of the attached file. In this case, the usage is determined to be for private if the attached file is not included.

Moreover, when the attached file is included in the transmitted email and the information on the size of attached file is received as the tag information, the usage may be determined to be for private or not based on the size of attached file. In this case, the usage is determined to be for business if the size of attached file is smaller than a predefined size.

Moreover, in the step S18, not the destination address but the originating address may be received as the tag information to determine whether the usage is for private or not based on the originating address. In this case, the usage is determined to be for private if the originating address is not an email address provided in the office.

Moreover, in the step S18, the data traffic may be received as the tag information to determine whether the usage is for private or not based on the data traffic. In this case, the usage is determined to be for private if the data traffic is smaller than a predefined value.

Moreover, the above-mentioned methods may be combined. For example, it may determine whether the usage is for private or not based on the data traffic and the size of attached file. In this case, the usage may be determined to be for private if the data traffic is smaller than a predetermined value and the size of attached file is smaller than a predetermined size. Moreover, another method may be used to determine whether the usage is for private or not.

The usage-based charge calculating module 32 of the charge management server 10 calculates the usage-based charge based on the result of the above-mentioned step S18 or step S19 and the data traffic acquired in the step S13 (Step S20).

In the step S20, the usage-based charge calculated by the usage-based charge calculating module 32 is calculated based on the price plan acquired in the step S10, and the amount of charge and the data amount are stored in the charge amount table shown in FIG. 5 described later.

Charge Amount Table

With reference to FIG. 5, the charge amount table calculated and stored by the usage-based charge calculating module 32 is described below.

The charge amount table is stored in the storage unit 13 of the charge management server 10. The charge amount table associates the usages, the data amount transferred in the data communication, and the amount of charge. The charge amount table stores the amount of charge and the data amount according to the usage, which are calculated by the usage-based charge calculating module 32 in the step S20. Whenever the data communication terminal 100 executes data communication, the usage-based charge calculating module 32 updates the data amount and the amount of charge for business use or for private use in the charge amount table. The charge amount table may be not updated at each data communication but may additionally store the data amount and the amount of charge with the usage.

The billing module 22 of the charge management server 10 executes the charging process based on the charge amount table (Step S21).

In the step S21, the billing module 22 charges the amount of charges for private use and for business use based on the charge amount table. The amount of charge for business use is charged to the company, and the amount of charge for private use is charged to the user.

The billing module 22 of the charge management server 10 executes the payment process to pay the total amount of charges for private use and for business use to the common carrier (Step S22). Above-mentioned process is the charge management process executed by the charge management server 10 and the data communication terminal 100.

Second Embodiment

System Configuration of Charge Management System 1

The second preferred embodiment of the present invention will be explained below. The explanation of the system configuration of the charge management system 1 is omitted because it is the same as that of the system configuration diagram of FIG. 1.

Functions

Figure 6:
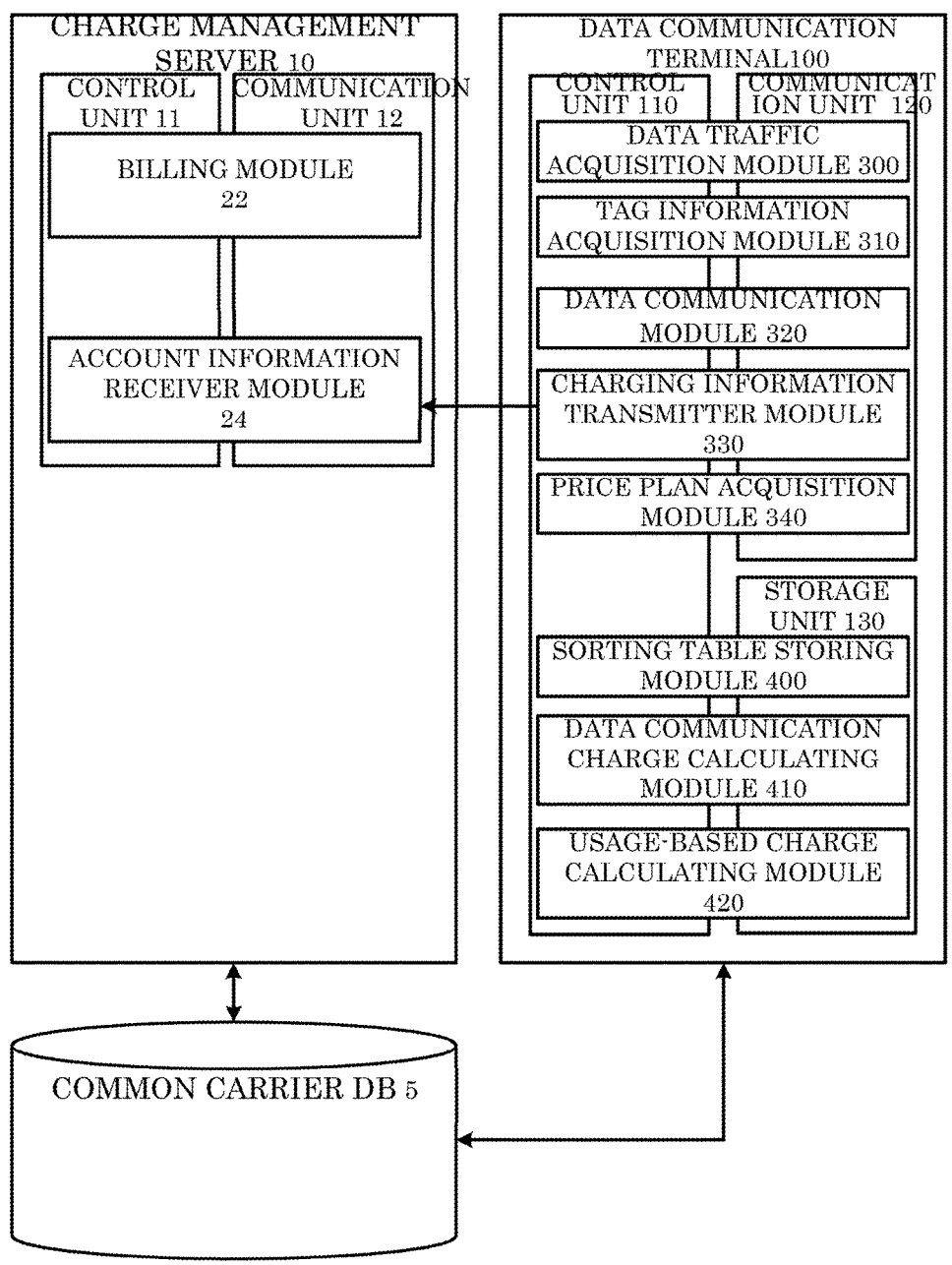
FIG. 6 shows the functional block diagram of a charge management server 10 and a data communication terminal 100 in the second embodiment.

The configuration of each device is described below with reference to FIG. 6. Details of the configuration same as that of the first embodiment are omitted.

The charge management server 10 provides with a control unit 11 and a communication unit 12 in the same way as the first embodiment. The control unit 11 reads a predetermined program and cooperates with the communication unit 12 to achieve a billing module 22 and a charging information receiver module 24.

The data communication terminal 100 includes a control unit 110, a communication unit 120 and an input-output unit in the same way as the first embodiment.

The data communication terminal 100 also includes a data storage unit such as a hard disk, semiconductor memory, a recording medium, or a memory card as a storage unit 130 storing data and files. The data communication terminal 100 stores the above-mentioned sorting table and the charge amount table in the storage unit 130.

The control unit 110 also reads a predetermined program and cooperates with the communication unit 120 to achieve a data traffic acquisition module 300, a tag information acquisition module 310, a data communication module 320, a charging information transmitter module 330, and the price plan acquisition module 340. The control unit 110 also reads a predetermined program and cooperates with the storage unit 130 to achieve the sorting table storing module 400, a data communication charge calculating module 410, and a usage-based charge calculating module 420.

Charge Management Process

Figure 7:
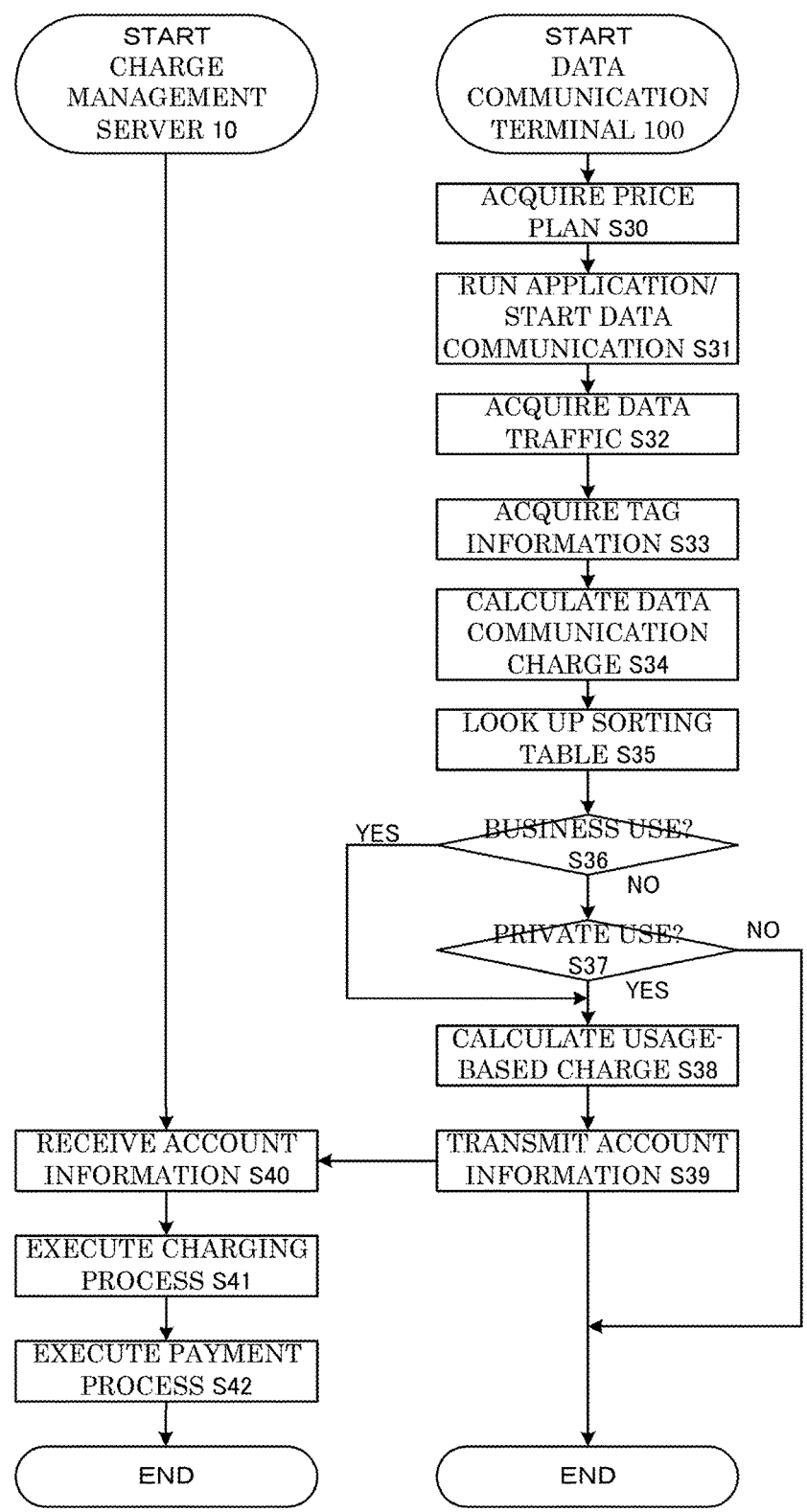
FIG. 7 shows the flow chart of the charge management process executed by a charge management server 10 and a data communication terminal 100 in the second embodiment.

FIG. 7 is the flowchart of the charge management process executed by the charge management server 10 and the data communication terminal 100. The process executed by the modules of each of the above-mentioned devices will be explained together with this process.

The price plan acquisition module 340 of the data communication terminal 100 acquires the price plan beforehand from the common carrier DB 5 beforehand (Step S30). In the step S30, the price plan acquired by the price plan acquisition module 340 may be a price plan for which each user has contracted with the common carrier or stored in the data communication terminal 100 beforehand. The price plan may be a plan for which the administrator of charge management server 10 contracted with a common carrier beforehand. Moreover, the price plan may not be a price plan of each data communication terminal 100 but a price plan for which the charge management server 10 has contracted in bulk with a common carrier. Moreover, the price plan stored in the charge management server 10 may be acquired. Moreover, it may be another price plan.

The data communication module 320 of the data communication terminal 100 receives the operation to the input-output unit of the data communication terminal 100 and the selection and the execution of an application. The data communication module 320 of the data communication terminal 100 starts the data communication of the executed application (Step S31). The explanation of the application executed by the data communication module 320 is omitted because it is the same way as that of the application executed by the above-mentioned data communication module 220.

The data traffic acquisition module 300 of the data communication terminal 100 acquires the data traffic of the data communication by the application executed by the data communication module 320 (Step S32). In the step S32, the data traffic acquired by the data traffic acquisition module 300 is generated by each application. In the step S32, the data communication terminal 100 determines whether the on-going data communication is LTE or Wi-Fi®. If the data communication terminal 100 determines that it is LTE, the data traffic acquisition module 300 acquires the data traffic. If the data communication terminal 100 determines that the on-going data communication is Wi-Fi®, the data traffic acquisition module 300 terminates the current process without acquiring the data traffic.

The tag information acquisition module 310 of the data communication terminal 100 acquires tag information of the data communication executed by the data communication module 320 (Step S33). In the step S33, the explanation of the tag information acquired by the tag information acquisition module 310 is omitted because it is the same as that of the above-mentioned tag information.

The data communication charge calculating module 410 of the data communication terminal 100 calculates data communication charge for the data traffic based on the acquired data traffic (Step S34).

The sorting table storing module 400 of the data communication terminal 100 looks up the sorting table (Step S35) and determines whether data communication is private use or business use based on the acquired tag information (Step S36 and Step S37). In this embodiment, the sorting table is stored in the storage unit 130 of the data communication terminal 100. The explanation of each item of the sorting table is omitted because it is the same as that of the first embodiment.

The registration of each item to the sorting table may be entered by the user, or item data entered by the administrator of charge management server 10 may be downloaded and stored in the data communication terminal 100. Moreover, other items may be registered beforehand in the same way as the first embodiment.

The usage-based charge calculating module 420 of the data communication terminal 100 determines whether the usage of the data communication received is for business or not based on the acquired tag information and the sorting table (Step S36).

In the step S36, the usage-based charge calculating module 420 determines whether the usage is for business or not based on the usage associated with the tag information acquired by the tag information acquisition module 310. If determining that the usage is for business (Step S36: "YES"), the usage-based charge calculating module 420 calculates the usage-based charge and stores the amount of charge and the data amount in the charge amount table described later (Step S38). In the step S36, the explanation of the process executed by the usage-based charge calculating module 420 is omitted because it is the same as that of the process in the step S18 mentioned above.

In the step S36, if the usage is determined not to be for business (Step S36: "NO"), the usage-based charge calculating module 420 determines whether the usage is for private or not (Step S37).

In the step S37, the usage-based charge calculating module 420 determines whether the usage is for private or not based on the usage associated with the tag information acquired by the tag information acquisition module 310. If determining that the usage is for private (Step S37: "YES"), the usage-based charge calculating module 420 calculates the usage-based charge and stores the amount of charge and the data amount in the charge amount table described later (Step S38). Moreover, in the step S37, if determining that the usage is not for private (Step S37: "NO"), the usage-based charge calculating module terminates the current process.

If determining that the usage is not for business in the above-mentioned step S36 and is not for private in the step S37, the usage may be considered to be for either business or private to calculate the data communication charge. Moreover, in this case, the notification may be sent to the administrator of the charge management server 10 to notify the usage is unknown, and a process to add the information on whether the usage is for business or private to the sorting table may be executed.

In the step S37, the process executed by the usage-based charge calculating module 420 is omitted because it is the same as that of the process in the above-mentioned step S19.

The usage-based charge calculating module 420 of the data communication terminal 100 calculates the usage-based charge based on the result of the above-mentioned step S36 or step S37, and the data traffic acquired in the step S32 (Step S38).

In the step S38, the usage-based charge calculated by the usage-based charge calculating module 420 is calculated based on the price plan acquired in the step S30 and the amount of charge, and the data amount is stored in the charge amount table described later. In this embodiment, the charge amount table is stored in the storage unit 130 of the data communication terminal 100. The explanation of each item of the charge amount table is omitted because it is the same as that of the first embodiment.

The charging information transmitter module 330 of the data communication terminal 100 transmits the amount of charge stored in the charge amount table as charging information to the charge management server 10 (Step S39).

The charging information receiver module 24 of the charge management server 10 receives charging information from the charging information transmitter module 330 of the data communication terminal 100 (Step S40).

The billing module 22 of the charge management server 10 executes the charging process based on the received charging information (Step S41). In the step S40, the billing module 22 charges the amount of charge for private use and for business use based on the received charging information. The billing module 22 charges the amount of charge for business use to the company, and charges the amount of charge for private use to the user.

The billing module 22 of the charge management server 10 executes the payment process to pay the total amount of charges for private use and for business use to the common carrier (Step S42). Above-mentioned process is the charge management process executed by the charge management server 10 and the data communication terminal 100 in the second embodiment.

To achieve the means and the function that are described above, a computer (including CPU, an information processor, and various terminals) reads and executes a predetermined program. For example, the program is provided in the form recorded in a computer-readable medium such as a flexible disk, CD (CD-ROM, etc.), and DVD (DVD-ROM, DVD-RAM, etc.). In this case, a computer reads a program from the recording medium, forwards and stores the program to and in an internal or an external storage, and executes it. The program may be previously recorded in, for example, a storage (recording medium) such as a magnetic disk, an optical disk, and a magneto-optical disk and provided from the storage to a computer through a communication line.

The embodiment of the present invention is described above. However, the present invention is not limited to the above-mentioned embodiment. The effect described in the embodiment of the present invention is only the most preferable effect produced from the present invention. The effect of the present invention is not limited to those described in the embodiment of the present invention.

REFERENCE SIGNS LIST 1 charge management system
5 common carrier DB
10 charge management server
100 data communication terminal

The invention claimed is:

1. A charge management system comprising:
a data communication terminal and a charge management server managing a charge for the data communication terminal, wherein
the data communication terminal includes:
  a data communication unit running an application to execute data communication over a given data communication pathway; and
  a data communication information transmitter unit transmitting tag information and the data traffic of the data communication to the charge management server in response to the execution of the data communication; and
the charge management server includes:
  a data communication charge calculating unit calculating data communication charge corresponding to the data traffic received from the data communication terminal via said given data communication pathway; and
  a usage-based charge calculating unit determining whether the data traffic over said given data communication pathway is for private use or for business use based on the tag information received from the data communication terminal to calculate data communication charge for each usage;
wherein the usage-based charge calculating unit determines the usage based on an email address included in the received tag information to calculate the data communication charge for each usage.

2. A charge management system comprising:
a data communication terminal and a charge management server managing a charge for the data communication terminal, wherein
the data communication terminal includes:
  a data communication unit running an application to execute data communication over a given data communication pathway; and
  a data communication information transmitter unit transmitting tag information and the data traffic of the data communication to the charge management server in response to the execution of the data communication; and
the charge management server includes:
  a data communication charge calculating unit calculating data communication charge corresponding to the data traffic received from the data communication terminal via said given data communication pathway; and
  a usage-based charge calculating unit determining whether the data traffic over said given data communication pathway is for private use or for business use based on the tag information received from the data communication terminal to calculate data communication charge for each usage;
wherein the usage-based charge calculating unit determines the usage based on the size of an attached file included in the received tag information to calculate the data communication charge for each usage.

3. A charge management system comprising:
a data communication terminal and a charge management server managing a charge for the data communication terminal, wherein
the data communication terminal includes:

a data communication unit running an application to execute data communication over a given data communication pathway; and a data communication information transmitter unit transmitting tag information and the data traffic of the data communication to the charge management server in response to the execution of the data communication; and the charge management server includes:

a data communication charge calculating unit calculating data communication charge corresponding to the data traffic received from the data communication terminal via said given data communication pathway; and a usage-based charge calculating unit determining whether the data traffic over said given data communication pathway is for private use or for business use based on the tag information received from the data communication terminal to calculate data communication charge for each usage;

wherein the usage-based charge calculating unit determines the usage based on the data traffic included in the received tag information to calculate data communication charge for each usage.

4. A data communication terminal managing its own data communication charge, comprising:

a data communication unit running an application to execute the data communication over a given data communication pathway; a data communication information storage unit to acquire tag information and the data traffic of the data communication via said given data communication pathway in response to the execution of the data communication;

a data communication charge calculating unit calculating data communication charge corresponding to the acquired data traffic; a usage-based charge calculating unit determining whether the data traffic communicated via said given data communication pathway is for private use or for business use based on the acquired tag information to calculate data communication charge for each usage; and a data communication charge transmitter unit transmitting the calculated data charge for each usage; wherein the usage-based charge calculating unit determines the usage based on the data traffic included in the received tag information to calculate data communication charge for each usage or wherein the usage-based charge calculating unit determines the usage based on the size of an attached file included in the received tag information to calculate the data communication charge for each usage;

wherein the usage-based charge calculating unit determines the usage based on the data traffic included in the received tag information to calculate data communication charge for each usage or wherein the usage-based charge calculating unit determines the usage based on the size of an attached file included in the received tag information to calculate the data communication charge for each usage or wherein the usage-based charge calculating unit determines the usage based on an email address included in the received tag information to calculate the data communication charge for each usage.

5. The data communication terminal according to claim 4 further comprising a billing unit charging the data communication charge for each usage calculated by the usage-based charge calculating unit to a billing address based on the usage.

* * * * *